United States Patent
Kim et al.

(10) Patent No.: US 8,774,116 B2
(45) Date of Patent: Jul. 8, 2014

(54) APPARATUS AND METHOD FOR ASSIGNING ACID IN PERSISTENT RESOURCE ALLOCATION

(75) Inventors: Jeongki Kim, Gyeonggi-Do (KR); Kiseon Ryu, Gyeonggi-Do (KR); Youngsoo Yuk, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 13/503,809

(22) PCT Filed: Dec. 21, 2010

(86) PCT No.: PCT/KR2010/009174
§ 371 (c)(1),
(2), (4) Date: Apr. 24, 2012

(87) PCT Pub. No.: WO2011/078564
PCT Pub. Date: Jun. 30, 2011

(65) Prior Publication Data
US 2012/0207122 A1    Aug. 16, 2012

Related U.S. Application Data

(60) Provisional application No. 61/289,397, filed on Dec. 23, 2009.

(30) Foreign Application Priority Data

Dec. 14, 2010  (KR) .......................... 10-2010-0127886

(51) Int. Cl.
*H04W 4/00*    (2009.01)
*H04W 72/04*  (2009.01)

(52) U.S. Cl.
USPC .......................................... 370/329; 370/341

(58) Field of Classification Search
None
See application file for complete search history.

(56) References Cited

U.S. PATENT DOCUMENTS

| | | | |
|---|---|---|---|
| 2003/0108027 A1* | 6/2003 | Kim et al. | 370/345 |
| 2008/0065944 A1* | 3/2008 | Seol et al. | 714/748 |
| 2008/0165670 A1* | 7/2008 | Tao et al. | 370/203 |
| 2009/0103561 A1* | 4/2009 | Qi et al. | 370/468 |
| 2009/0219878 A1* | 9/2009 | Oh et al. | 370/329 |
| 2009/0276673 A1* | 11/2009 | Kone et al. | 714/749 |
| 2011/0053626 A1* | 3/2011 | Lim et al. | 455/509 |
| 2011/0188432 A1* | 8/2011 | Yin | 370/311 |

OTHER PUBLICATIONS

Shrivastava et al., "Proposed Text on Determining ACID for Group Resource Allocation (15.2.6.8.3.1.2)"—IEEE 802.16 Broadband Wireless Access Working Group, pp. 1-4, Aug. 28, 2009.

(Continued)

*Primary Examiner* — Phuc Tran
*Assistant Examiner* — Soon-Dong D Hyun
(74) *Attorney, Agent, or Firm* — Birch, Stewart, Kolasch & Birch, LLP

(57) ABSTRACT

Disclosed is a method for allocating ACID in a persistent resource allocation including setting an ACID field of a map message to have the same ACID value as ACID value used in a previous persistent allocation upon occurrence of a change, in case where the change occurs in information related to a persistent resource previously allocated to a terminal, sending the map message including the set ACID field to the terminal in the same subframe as a subframe, in which the persistent resource has been allocated prior to the change occurred, and allocating the ACID value of the set ACID field as ACID value for a first data burst after the transmission of the map message.

15 Claims, 4 Drawing Sheets

(56) References Cited

OTHER PUBLICATIONS

Shrivastava et al., "Proposed Text on Determining ACID for Group Resource Allocation (15.2.9.3)"—IEEE 802.16 Broadband Wireless Access Working Group, pp. 1-4, Nov. 6, 2009.

Shrivastava et al., "Proposed Text on Determining ACID for Persistent Allocation (15.2.7.1)"—IEEE 802.16 Broadband Wireless Access Working Group, pp. 1-8, Nov. 6, 2009.

Srinivasan et al., "Proposed Text on Determining ACID for Persistent Scheduling (15.2.6.1)"—IEEE 802.16 Broadband Wireless Access Working Group, pp. 1-4, Aug. 28, 2009.

* cited by examiner

APPARATUS AND METHOD FOR ASSIGNING ACID IN PERSISTENT RESOURCE ALLOCATION

CROSS-REFERENCE TO RELATED APPLICATIONS

This application is the National Phase of PCT/KR2010/009174 filed on Dec. 21, 2010, which claims priority under 35 U.S.C. 119(e) to U.S. Provisional Application No. 61/289,397 filed on Dec. 23, 2009 and under 35 U.S.C. 119(a) to Patent Application No. 10-2010-0127886 filed in the Republic of Korea on Dec. 14, 2010, all of which are hereby expressly incorporated by reference into the present application.

TECHNICAL FIELD

This specification relates to an apparatus and method for assigning hybrid automatic repeat request channel identifier (ACID) in a persistent resource allocation in a broadband wireless communication system, and more particularly, an apparatus and method for allocating ACID to be distinguishable from ACID prior to reallocation, upon generation of the reallocation.

BACKGROUND ART

In general, in a broadband wireless communication system, a base station allocates resources to each terminal for transmission and reception of packets. The base station then sends MAP message, which indicates resource assignment results, such as location and size of an allocated resource, modulation method, encoding rate and the like, to the terminal via a downlink channel. Here, the resource allocation is performed with respect to resources within a specific interval, accordingly, MAP Information Element (IE) is sent at each of the specific interval.

However, for a service for periodically sending packets with the same size, such as a Voice Over Internet Protocol (VoIP) service, transmission of MAP IEs with the same contents at every time of sending a packet causes resource consumption.

Hence, for a service having a specific transmission period, a persistent allocation for persistently allocating resources may be applied so as to decrease resource consumption due to the MAP IEs. According to the persistent allocation technology, for downlink communication, MAP IE and packet are sent only upon initial resource allocation, and thereafter only packets are sent without the MAP IE. Therefore, a terminal using a persistently allocated resource keeps using the persistently allocated resource without a MAP IE until receiving allocation release information or allocation change information. Here, for the sake of explanation, the persistently allocated resource is referred to as 'persistent resource.'

Table 1 shows an example of MAP IE including parameters for allocation persistent resources to a terminal.

TABLE 1

| Syntax | Size(bit) | Scription/Notes |
|---|---|---|
| DL Persistent Allocation A-MAP_IE( ){ | | |
| A-MAP IE Type | 4 | DL Persistent Allocation A-MAP IE |
| Allocation Period | 2 | Period of persistent allocation. If(Allocation Period=0b00), it indicates the deallocation of a persistently allocated resource. 0b00:deallocation 0b01:2 frames 0b10:4 frames 0b11:8 frames |
| ... | | |
| Resource Index | 11 | 5 MHz: 0 in first 2 MSB bits + 9 bits for resource index 10 MHz: 11 bits for resource index 20 MHz: 11 bits for resource index Resource index includes location and allocation size |
| Long TTI Indicator | 1 | Indicates number of subframes spanned by the allocated resource. 0b0: 1 subframe (default) 0b1: 4 DL subframes for FDD or all DL subframes for TDD |
| HFA | 6 | HARQ Feedback Allocation |
| ACID | 4 | HARQ channel identifier. N_ACIDs: Number of ACIDs for implicit cycling of HARQ channel identifier N_ACID=Floor{ PA_Max_ReTx_Delay/ (Allocation Period*Frame_length) }+1 |
| ... | | |

In Table 1, 'HARQ Channel Identifier (ACID)' field indicates ACID for identifying (distinguishing) HARQ processes performed using allocated resources.

Here, the HARQ process denotes a process performed until one HARQ packet is successfully received, and includes initial transmission, retransmission, combining and the like, in association with the one HARQ packet. Therefore, HARQ packets belonging to the same HARQ process may include the same ACID. Here, the ACID may be called as HARQ process ID. That is, the ACID is an identifier for allowing a terminal to work a plurality of HARQ processes in parallel, and a plurality of HARQ processes belonging to one terminal are granted different ACIDs. Hence, for combining an initially transmitted packet and a retransmitted packet, a receiving end combines HARQ packets having the same ACID.

In general, in order to use the ACID, 'start or initial ACID' and 'the number of ACIDs (N_ACID)' are needed. For example, if the initial ACID is 3 and the number of ACIDs is 3, ACIDs 3, 4 and 5 are circularly used as ACIDs of an allocated persistent resource. In other words, if the number of ACIDs is 3, maximum three of HARQ processes are worked in one persistent resource, and ACIDs of the three HARQ processes are set to 3, 4 and 5.

More concretely, ACID of the first HARQ process is set to 3, ACID of the second HARQ process is set to 4 and ACID of the third HARQ process is set to 5. If a fourth HARQ process is generated, ACID of the fourth HARQ process is set to 3. For allocation of persistent resources, the base station sends MAP IE one time at the beginning, so the terminal implicitly applies ACIDs in the order of 3, 4 and 5. Here, as aforesaid, since the first and fourth HARQ processes use the same ACID, the first HARQ process should be terminated prior to starting the fourth HARQ process.

In other words, HARQ packet of the first HARQ process should be successfully received prior to receiving HARQ packet of the fourth HARQ process, and HARQ channel corresponding to the ACID of the first HARQ process should be flushed to store the HARQ packet of the fourth HARQ process.

That is, the maximum number of HARQ transmission and the number of ACIDs are in a functional relation therebetween. Hence, upon circularly running the ACIDs, the sufficiently large number of ACIDs must be present to avoid duplication (repetition) of ACIDs. Also, the number of HARQ processes simultaneously used for one persistent resource and the number of ACIDs may be transferred while a terminal and a base station establish a connection therebetween or via a Broadcast Channel (BCH) periodically sent by the base station.

FIG. 1 is a flowchart showing a typical persistent resource allocation method for allocating ACIDs to data burst via DL PA A-MAP IE.

First, in order to allocate persistent resources to a terminal, a base station sends DL PA A-MAP IE including persistent resource allocation information to the terminal (S101).

Here, the base station may send the DL PA A-MAP IE to the terminal to allocate a new persistent resource or change a previously allocated persistent resource.

In order to allocate the new persistent resource to the terminal, the base station may send the DL PA A-MAP IE to a subframe, which is different from a subframe of a previous allocated persistent resource.

In addition, upon sending the DL PA A-MAP IE to the same subframe as the subframe of the previously allocated persistent resource, the base station intends to reallocate the previously allocated persistent resource other than allocating a new persistent resource.

As shown in FIG. 1, the base station sends the DL PA A-MAP IE to the terminal to allocate a new persistent resource to the terminal.

The DL PA A-MAP IE sent by the base station includes information related to an initial ACID value needed for allocating ACID in a persistent resource allocation and information related to the number of ACIDs available for the persistent resource allocation. That is, the initial ACID value and the ACID number value are included in ACID field of the DL PA A-MAP IE to be sent to the terminal.

The initial ACID value is set in consideration of ACID values being used at the time point of the persistent resource allocation and the number of consecutively available ACIDs.

The base station also decides the number of ACIDs available for the persistent resource allocation using persistent resource allocation information included in the DL PA A-MAP IE, namely, allocation period and system parameters (e.g., Tproc, LongTTI Indicator, Frame_length, N_MAX-ReTx).

For example, using Table 1, in case of initial ACID (included in DL Persistent A-MAP) value=0, process time (Tproc)=3, LongTTI Indicator=1, Frame_length=5 ms, Allocation Period (0b10)=4 frames and N_MAX-ReTx=8, the decided results are PA_ReTx_Interval=10 ms, PA_Max_ReTx_Delay=8*10=80 ms, and N_ACID=Floor{80 ms/(4*5)}+1=5.

Therefore, the ACID values used in the corresponding persistent resource allocation are 0, 1, 2, 3 and 4.

FIG. 1 shows that the initial ACID value is '0' and N_ACID value is '3.'

Referring to FIG. 1, if the initial ACID value and the N_ACID value both included in the DL PA A-MAP IE are '0' and '3,' respectively, ACID values available for the persistent resource allocation are 0, 1 and 2 (S102).

Therefore, the base station allocates the initial ACID value '0' included in the DL PA A-MAP IE to the first DL burst, which is sent in an area indicated by the DL PA A-MAP IE (S103-1).

Next, the base station allocates ACID values to DL bursts (second, third, . . . ), succeeding the first DL burst, using the N_ACID value 3 (i.e., 0, 1, 2) with increasing the ACID value by one in a cycling manner (S103-2~S103-4).

That is, the base station repeats the process of allocating ACID '0' to the first DL burst sent in the area indicated by the DL PA A-MAP IE, ACID '1' to the second DL burst, ACID '2' to the third DL burst and circularly ACID '0' to the fourth DL burst (S103).

Here, when the persistent resource is reallocated by the DL PA A-MAP IE, the terminal updates previously set persistent resource allocation information to the new persistent resource allocation information included in the DL PA A-MAP IE.

However, in case where the base station reallocates a persistent resource to the terminal with respect to a previously allocated persistent resource using the above method, the currently retransmitted ACID value may be problematically the same as ACID value used for reallocation.

Especially, when ACID value different from ACID value prior to reallocation is not able to be used as ACID value used for reallocation, the following problems may occur.

For example, when a persistent resource having ACID values 0, 1, 2, 3 and 4 has been allocated, if reallocation is generated at a time point of ACID value='2,' and the reallocation is performed by setting the initial ACID value to '2' and N_ACID value to '5,' ACID values used for the reallocation are 2, 3, 4, 5 and 6.

However, when five ACID values cannot consecutively be allocated among ACID values from 5 to 15, namely, the currently used ACID values are 5, 9, 10 and 15, the base station should reallocate five ACID values from 0 to 4.

Here, if a packet whose ACID value is 0 is being retransmitted, a packet corresponding to the previously allocated ACID value '0' and the packet corresponding to the currently reallocated ACID value '0' have the same ACID value, accordingly, the terminal and the base station cannot perform an appropriate operation for the corresponding persistent resource allocation.

DISCLOSURE OF INVENTION

Solution to Problem

Therefore, an object of the present invention is to address a problem that ACID value of a retransmitted packet, sent by a persistent resource allocation prior to reallocation, becomes the same as ACID value after reallocation, in a manner that when reallocation is generated in the persistent resource allocation, ACID value allocated to a data burst in a previous persistent resource allocation is allocated as ACID value of a first data burst after reallocation.

To achieve these and other advantages and in accordance with the purpose of the present invention, as embodied and broadly described herein, there is provided a method for allocating a hybrid automatic repeat request (HARQ) channel identifier (ACID) in a persistent resource allocation including setting an ACID field of a map message to have the same ACID value as ACID value used in a previous persistent allocation upon occurrence of a change, in case where the change occurs in information related to a persistent resource previously allocated to a terminal, sending the map message including the set ACID field to the terminal in the same subframe as a subframe, in which the persistent resource has been allocated prior to the change occurred, and allocating the ACID value of the set ACID field as ACID value for a first data burst after the transmission of the map message.

Also, the method may further include circularly allocating ACIDs to data bursts succeeding the first data burst using the ACID field of the map message after allocating the ACID value to the first data burst after the transmission of the map message.

The ACID field of the map message may further include the number of ACIDs available for the persistent resource allocation.

The number of ACIDs may be decided the same as the number of ACIDs of the persistent resource previously allocated to the terminal prior to the change occurred.

The persistent resource information may be at least one of a modulation and coding scheme (MCS) level, location and size of the persistent resource allocated to the terminal.

In accordance with one exemplary embodiment, this specification provides a method for allocating a hybrid automatic repeat request (HARQ) channel identifier (ACID) in a persistent resource allocation including receiving a map message including an ACID field in a specific subframe from a base station, the ACID field indicating HARQ channel identification information, checking whether or not a previously allocated persistent resource is present in the specific subframe, in which the map message is received, detecting ACID value allocated to a data burst upon reception of the map message, in the persistent resource allocation prior to the reception of the map message, when the previously allocated persistent resource is present in the specific subframe, and allocating the detected ACID value as ACID value for a first data burst after the map message.

The method may further include, after allocating the ACID value to the first data burst, circularly allocating ACID values to data bursts succeeding the first data burst using the ACID field included in the map message.

In accordance with one exemplary embodiment, this specification provides a terminal for allocating a hybrid automatic repeat request (HARQ) channel identifier (ACID) in a persistent resource allocation including a receiving unit configured to receive a map message in a specific subframe from a base station, the map message including an ACID field indicating HARQ channel identification information, and a controller configured to detect ACID value allocated to a data burst upon reception of the map message in the persistent resource allocation prior to the reception of the map message, in case where a previously allocated persistent resource is present in the specific subframe in which the map message is received, and allocate the detected ACID value as ACID value of a first data burst after the map message.

The controller may be configured to circularly allocate ACID values to data bursts succeeding the first data burst using the ACID field included in the map message after allocating the ACID value to the first data burst.

Advantageous Effects of Invention

This specification can provide an effect of addressing the problem of using the same ACID value, by virtue of allocating ACID value for a data burst, being used in a previous resource allocation upon reallocation, as ACID value of a first data burst after the reallocation, upon generation of the reallocation for a persistent resource.

Also, this specification can provide an effect of identifying ACIDs, even if the same ACID value is used, by toggling PA_ACID_SN included in a map message upon generation of reallocation for a persistent resource.

MODE FOR THE INVENTION

Figure 1:
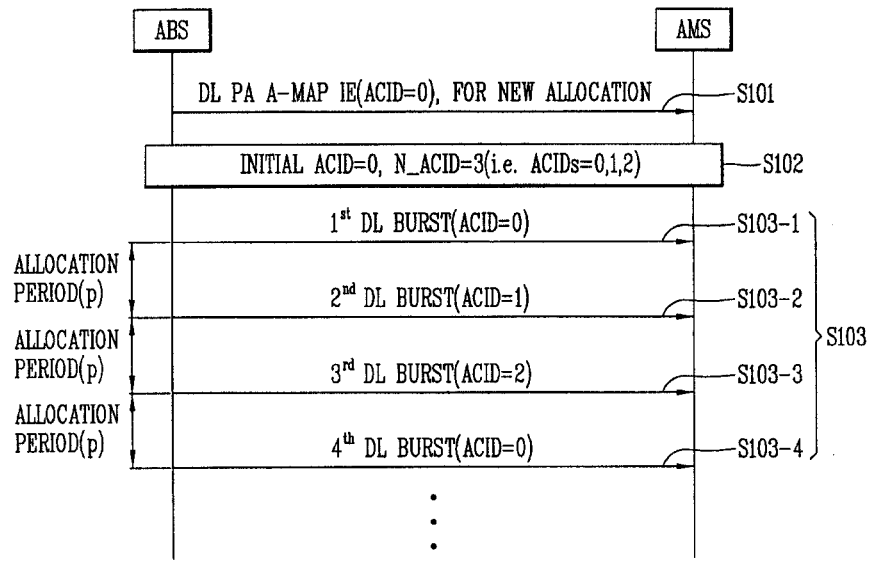
FIG. 1 is a flowchart showing a typical persistent resource allocation method for allocating ACIDs to data bursts via DL PA A-MAP IE.

Reference will now be made in detail to the preferred embodiments of the present invention, examples of which are illustrated in the accompanying drawings. It should be understood that the description herein will be given of essential parts required to understand operations according to this specification and description of the other parts will be omitted to obviate obscurity of the point of the invention.

The exemplary embodiments herein are combinations of components and characteristics in certain forms. Each component or characteristic should be considered to be optional unless being explicitly described. Each component or characteristic may be embodied in the form of non-combination with other components or characteristics. Also, the exemplary embodiments can be implemented by combination of part of components and/or characteristics. The sequence of operations described in the exemplary embodiments may differ. Part of configurations or characteristics in one exemplary embodiment will be included in another exemplary embodiment, or be replaced with corresponding configurations or characteristics in another embodiment.

The exemplary embodiments in this specification are described herein on the basis of relation of data transmission and reception between a base station and a terminal. Here, the base station may indicate a terminal node of a network, which performs communications directly with the terminal. Specific operations, which will be described as being performed by the base station in this specification, may be performed by an upper node of the base station.

That is, it is obvious that in a network comprising a plurality of network nodes including the base station, various operations performed for communications with the terminal can be performed by the base station or different network nodes other than the base station. 'Base station' will be replaced with other terms, such as a fixed station, Node B, eNode B (eNB), access point and the like. Also, 'terminal' may be replaced with other terms, such as user equipment (UE), mobile station (MS), mobile subscriber station (MSS) and the like.

The exemplary embodiment described herein may be embodied by various means. For example, the exemplary embodiments may be implemented by hardware, firmware, software, or combination of them.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors.

For firmware or software implementation, the method according the exemplary embodiments described herein may be implemented in the form of module, procedure, function or the like, which performs functions or operations described above. Software codes may be stored in a memory unit to be operated by a processor. The memory unit may be present inside or outside the processor, to exchange (transceiver) data with the processor via various means, which have been already known.

Specific terms used in the following description are provided for better understanding of the specification, and use of such terms may be changed into different forms within the scope of this invention.

This specification provides an ACID allocation method in case of reallocating a persistent resource previously allocated to a terminal (i.e., allocating a persistent resource in a subframe, in which another persistent resource has been already allocated), namely, an allocation method different from a new persistent resource allocation.

Hereinafter, description will be given of an ACID allocation method for identifying ACID prior to reallocation and ACID after reallocation when a reallocation is generated with respect to a persistent resource previously allocated to a terminal.

First Exemplary Embodiment

The first exemplary embodiment provides an ACID allocation method, in which in case where reallocation is generated with respect to a persistent resource previously allocated to a terminal, ACID values (initial ACID value and the number of ACIDs (N_ACID)) used in a previous persistent allocation are used for the reallocation as they are upon generation of the reallocation, and ACID value, which is sent via DL/UL PA A-MAP IE, is allocated to a first DL or UL burst after the reallocation.

ACID Allocation Method in Downlink (DL)

Figure 2:
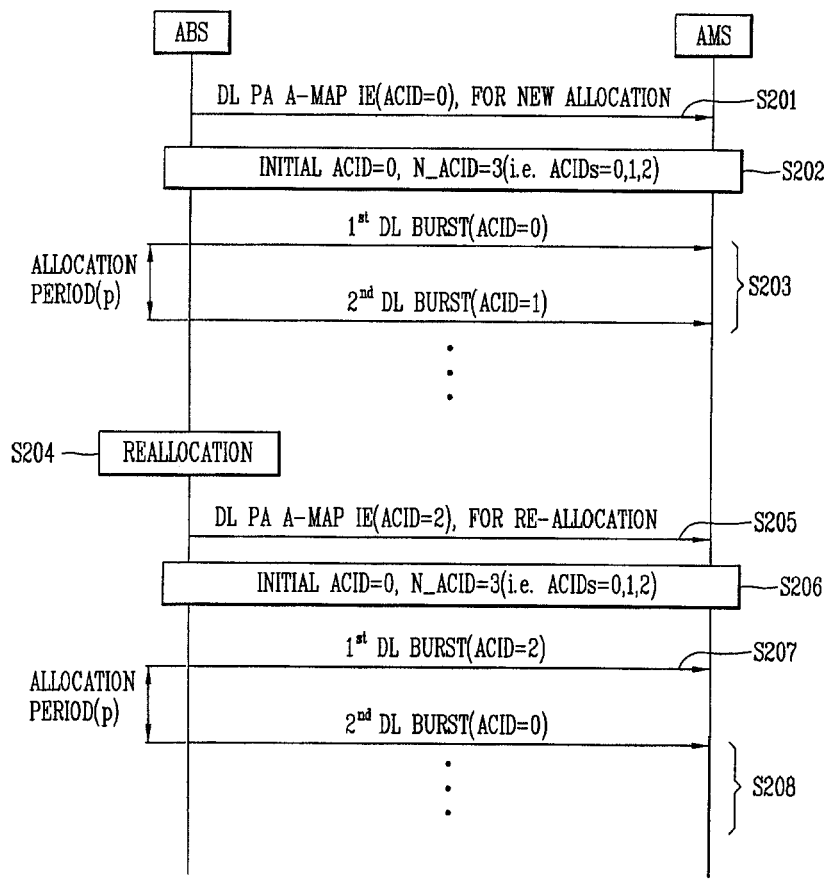
FIG. 2 is a flowchart showing ACID allocation method in downlink upon persistent resource reallocation, in accordance with a first exemplary embodiment.

FIG. 2 is a flowchart showing ACID allocation method in downlink upon persistent resource reallocation, in accordance with a first exemplary embodiment.

First, a base station may send a map message including persistent resource allocation information to a terminal in order to allocate a new persistent resource to the terminal (S201). The map message may be DL PA A-MAP IE.

FIG. 2 exemplarily shows that the map message is DL PA A-MAP IE (hereinafter, referred to as 'DL PA A-MAP').

The DL PA A-MAP may include an ACID field indicating HARQ channel identifier for a persistent resource. The ACID field may include information representing an initial ACID value for a persistent resource allocation, and information representing the number of ACIDs (N_ACID) available for the persistent resource allocation.

FIG. 2 shows that when the initial ACID value is set to '0' and N_ACID is determined as 3 in the DL PA A-MAP for a new persistent resource allocation, ACID values used for the persistent resource allocation are 0, 1 and 2 (S202).

Afterwards, the base station may allocate ACID to DL burst at every persistent resource allocation period in an ACID cycling manner, namely, in a manner of circularly using ACIDs based upon the initial ACID value of '0' and N_ACID of 3.

That is, the base station circularly allocates ACIDs to the respective DL bursts, which are sent to an area indicated by the DL PA A-MAP IE, starting from the initial ACID value of '0' in sequence of 1, 2, 0, 1, 2, 0, . . . , based upon the ACID cycling method.

As shown in FIG. 2, ACID '0' is used in the first DL burst, ACID '1' in the second DL burst, ACID '2' in the third DL burst, and circularly ACID '0' in the fourth DL burst again (S203).

During the persistent allocation between the base station and the terminal, for applying a link adaptation (Modulation and Coding Scheme (MCS) level change) or removing a resource hole, namely, when any change occurs in the previously allocated persistent resource information, the base station may perform reallocation for the currently allocated persistent resource (S204).

Here, the persistent resource information may indicate MCS level, location and size of a persistent resource allocated to the terminal.

The terminal and the base station may recognize whether the persistent resource allocation by the DL PA A-MAP is a new allocation or a reallocation of the previous persistent resource, based upon existence or non-existence of a persistent allocation in the corresponding subframe.

In order to reallocate a persistent resource previously allocated to the terminal, the base station may send DL PA A-MAP to a subframe, which is the same as the subframe of the previously allocated persistent resource (S205).

Prior to sending the DL PA A-MAP for reallocation, if the information related to the persistent resource previously allocated to the terminal has been changed, the base station may set the ACID field of the DL PA A-MAP to have the same ACID value as the current ACID value, which is being used upon occurrence of the change in the persistent allocation prior to the occurrence of the change.

That is, upon the occurrence of the change in the persistent resource information, the base station may set the ACID field of the DL PA A-MAP in order to use the ACID value, which has been allocated to a DL burst in the previous persistent resource allocation upon the occurrence of the change, as ACID value of the first DL burst after reallocation.

Also, the ACID field may further include information related to the number of ACIDs available for the persistent allocation.

The number of ACIDs may be the same as the number of ACIDs in the persistent resource allocation prior to reallocation or set by Equation 1 to be explained later. A method for setting the initial ACID value and the number of ACIDs will be described in detail as follows.

FIG. 2 exemplarily shows that the number of ACIDs is 3, which is the same value as the number of ACIDs prior to reallocation (S206).

Here, the base station may send the DL PA A-MAP including the set ACID field to the terminal in a subframe, which is the same subframe, in which the persistent resource has been already allocated prior to the occurrence of the change.

The process of generating the DL PA A-MAP may be a process of updating the initial ACID value and the number of available ACIDs or update system parameters due to the change in the persistent resource information.

Next, the base station may allocate the ACID value, which has been allocated to the DL burst upon the occurrence of the change in the persistent allocation prior to the occurrence of the change (i.e., prior to reallocation), as ACID value for the first DL burst after transmission of the DL PA A-MAP.

As shown in FIG. 2, upon reallocation in response to the change in the persistent resource information when ACID value for the DL burst is '2,' the ACID value allocated to the first DL burst after transmission of the DL PA A-MAP is '2' (S207).

After allocating the ACID value to the first DL burst after the reallocation, the base station allocates ACIDs to DL bursts succeeding the first DL burst, respectively, in a cycling manner by increasing ACID value for each DL burst by '1' based upon the ACID field included in the DL PA A-MAP.

That is, the base station circularly allocates ACID '0' to the second DL burst after reallocation, ACID '1' to the third DL burst, . . . , using the initial ACID value '0' and N_ACID '3', which are included in the DL PA A-MAP sent for reallocation (S208).

ACID Allocation Method in Uplink

Figure 3:
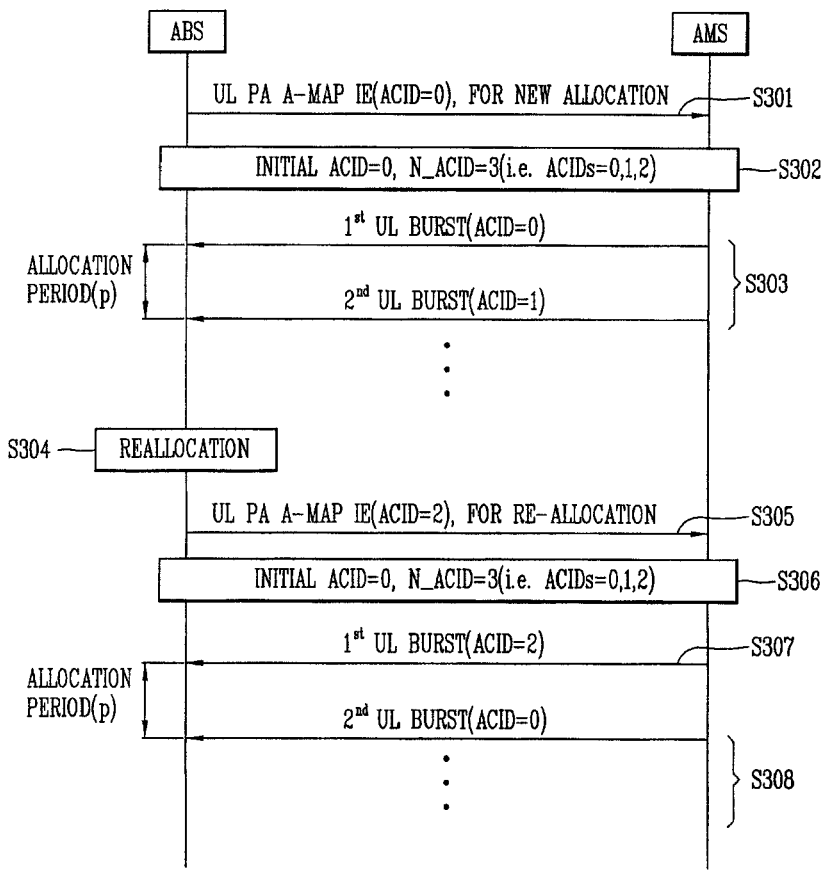
FIG. 3 is a flowchart showing ACID allocation method in uplink upon persistent resource reallocation, in accordance with a first exemplary embodiment.

FIG. 3 is a flowchart showing ACID allocation method in uplink upon persistent resource reallocation, in accordance with a first exemplary embodiment.

First, the base station may send UL PA A-MAP IE (hereinafter, referred to as 'UL PA A-MAP') including persistent resource information to the terminal in order to allocate a new persistent resource (S301).

The UL PA A-MAP may include an ACID field indicating HARQ channel identifier for a persistent resource. The ACID field may include information related to an initial ACID value for a persistent resource allocation, and information related to the number of ACIDs (N_ACID) available for the persistent resource allocation. The method for setting the initial ACID value and the number of ACIDs is the same as the corresponding method in downlink.

The terminal may then allocate ACIDs to UL bursts at every persistent resource allocation period in an ACID cycling manner, namely, in a manner of circularly using ACIDs, based upon the initial ACID value and the number of ACIDs included in the ACID field of the UL PA A-MAP sent by the base station.

That is, as shown in FIG. 3, when the initial ACID value is set to '0' and the number of ACID is determined as '3' in the UL PA A-MAP for the new persistent resource allocation, the ACID values used for the persistent resource allocation are 0, 1 and 2 (S302).

Here, the terminal circularly allocates ACIDs to the respective UL bursts, which are sent to an area indicated by the UL PA A-MAP IE, starting from the initial ACID value of '0' in sequence of 1, 2, 0, 1, 2, 0, . . . , based upon the ACID cycling method.

That is, ACID '0' is used in the first UL burst, ACID '1' in the second UL burst, ACID '2' in the third UL burst, and circularly ACID '0' in the fourth UL burst again (S303).

During the persistent allocation between the base station and the terminal, for applying a link adaptation (MCS level change) or removing a resource hole, namely, when any change occurs in the previously allocated persistent resource information, the base station may perform reallocation for the currently allocated persistent resource (S304).

The terminal and the base station may recognize whether a persistent resource allocation by the UL PA A-MAP is a new allocation or a reallocation of the existing persistent resource, based upon existence or non-existence of a persistent allocation in the corresponding subframe.

Upon receiving the UL PA A-MAP for reallocation from the base station, the terminal checks the ACID value for the UL burst, which is allocated via the previous UL PA A-MAP when the UL PA A-MAP is received. Referring to FIG. 3, upon receiving the UL PA A-MAP for reallocation from the base station upon ACID value='2' for the UL burst, the checked ACID value is '2' (S305).

Also, the base station sends the generated UL PA A-MAP to the terminal in the same subframe as the subframe, in which the persistent resource has been allocated prior to the change being occurred.

Here, the base station generates the UL PA A-MAP including ACID field, which includes ACID value the same as the current ACID value being used in the persistent resource previously allocated to the terminal prior to the change occurred. The ACID value of the ACID field may be used as ACID value for the first UL burst after transmission of the UL PA A-MAP.

The ACID field may further include information related to the number of ACIDs available for the persistent resource allocation after reallocation. Upon reallocation, referring to FIG. 3, the initial ACID value and the number of ACIDs included in the ACID field of the UL PA A-MAP sent to the terminal indicate a case where they are set the same as the initial ACID value and the number of ACIDs in the persistent allocation prior to the reallocation (S306).

Next, the terminal may allocate the ACID value, which has been checked (or detected) at upon reception of the UL PA A-MAP for reallocation, as the ACID value for the first UL burst after transmission of the UL PA A-MAP.

Referring to FIG. 3, the checked ACID value is '2' and the ACID value of the first UL burst after reallocation is '2' (S307).

After allocating the ACID value to the first UL burst after reallocation, the terminal may then allocate ACIDs to UL bursts succeeding the first UL burst, respectively, in a cycling manner by increasing ACID value for each UL burst by '1' based upon the ACID field included in the UL PA A-MAP.

That is, the terminal circularly allocates ACID '0' to the second UL burst after real-location, ACID '1' to the third UL burst, . . . , using the initial ACID value '0' and N_ACID '3', which are included in the UL PA A-MAP sent for reallocation (S308).

Method for Setting N_ACID (the Number of ACIDs) Upon Reallocation

Hereinafter, a method for setting the number of ACIDs (N_ACID) included in the ACID field of DL/UL PA A-MAP will be described in detail.

As a first method, the number of ACIDs may be set using the same method as setting the number of ACIDs (N_ACID) upon the new persistent resource allocation. That is, as aforesaid, the number of ACIDs may be set according to Equation 1 as follows.

$$N\_ACID = \text{Floor}\{PA\_Max\_ReTx\_Delay/(\text{Allocation Period} * Frame\_length)\} + 1 \quad [\text{Equation 1}]$$

Upon reallocation in the persistent resource allocation by the first method, the total number of available ACIDs (N_ACID) may be decided by the maximum retransmission delay (PA_MAX_ReTx_Delay) and an allocation period value in the persistent allocation.

For example, in case of initial ACID (included in DL/UL Persistent A-MAP)=0, Tproc=3, LongTTI Indicator=1, Frame_length=5 ms, Allocation Period(0b10)=4 frames and N_MAX-ReTx=8, the decided results are PA_ReTx_Interval=10 ms, PA_Max_ReTx_Delay=8*10=80 ms, and N_ACID=Floor{80 ms/(4*5)}+1=5.

Therefore, the ACID values used in the corresponding persistent resource allocation are 0, 1, 2, 3 and 4.

Table 2 shows an example of DL/UL Persistent Allocation A-MAP IE for decision of the number of ACIDs (N_ACID) according to the first method.

TABLE 2

| Syntax | Size(bit) | Description/Notes |
|---|---|---|
| DL/UL Persistent Allocation A-MAP_IE( ){ | | |
| A-MAP IE Type | 4 | DL/UL Persistent Allocation A-MAP IE |
| ... | | |
| ACID | 4 | HARQ channel identifier. The ACID field shall be set to the intial value of HARQ channel identifier for implicit cycling of HARQ channel identifiers. N_ACIDs: Number of ACIDs for implicit cycling of HARQ channel identifier N_ACID=Floor{PA_Max_ReTx_Delay/(Allocation Period*Frame_length)}+1 In re-allocation, this ACID field indicates the HARQ channel identifier of initial HARQ subpacket identified by this Persistent Allocation A-MAP IE and the implicit cycling method is adjusted from this ACID value. The initial ACID value and N_ACID value for re-allocation are the same as the initial ACID value and N_ACID value of previous persistent allocation. ... |

As a second method, upon relocation, the number of ACIDs is set to the same value as the number of ACIDs available for the persistent allocation prior to the reallocation, and the initial ACID value is also set to the same value as the initial ACID value used in the previous persistent allocation. That is, if the number of ACIDs (N_ACID) in the persistent allocation prior to reallocation is '3,' the number of ACIDs is '3' even in the reallocation, and for initial ACID=' 0,' the initial ACID for reallocation is set to '0.'

The ACID included in the UL/DL PA A-MAP IE upon reallocation may be used as ACID value for the first burst.

The reallocation may be used for establishing a link adaptation (i.e., MCS change) or avoiding a resource hole. In this case, parameters (e.g., allocation period, frame-length, PA_MAX_ReTx_Delay, etc.) for deciding the N_ACID may rarely change.

Hence, upon reallocation, even the use of the value, which has been used in the previous persistent allocation, may not cause any problem. If the base station performs reallocation for change of the allocation period, the base station may simultaneously perform both de-allocation and new allocation in the corresponding frame.

Table 3 shows an example of DL/UL Persistent Allocation A-MAP IE for decision of the number of ACIDs (N_ACID) according to the second method.

TABLE 3

| Syntax | Size(bit) | Description/Notes |
|---|---|---|
| DL/UL Persistent Allocation A-MAP_IE( ){ | | |
| A-MAP IE Type | 4 | DL/UL Persistent Allocation A-MAP IE |
| ... | | |
| ACID | 4 | HARQ channel identifier. The ACID field shall be set to the initial value of HARQ channel identifier for implicit cycling of HARQ channel identifiers. N_ACIDs: Number of ACIDs for implicit cycling of HARQ channel identifier N_ACID=Floor{PA_Max_ReTx_Delay/(Allocation Period*Frame_length)}+1 In re-allocation, ACID field indicates the HARQ channel identifier of HARQ subpacket identified by this Persistent Allocation A-MAP IE and implicit cycling is adjusted from this ACID value. The initial ACID value is the same as the initial ACID value of previous persistent allocation. N_ACID = Floor{ PA_Max_ReTx_Delay/(Allocation Period*Frame length) }+1, in re-allocation ... |

Second Exemplary Embodiment

The second exemplary embodiment provides a method for sending DL/UL Persistent Allocation A-MAP IE by including PA_ACID_SN for identifying the same ACID values, upon reallocation of a persistent resource previously allocated to a terminal.

Downlink (DL)

Figure 4:
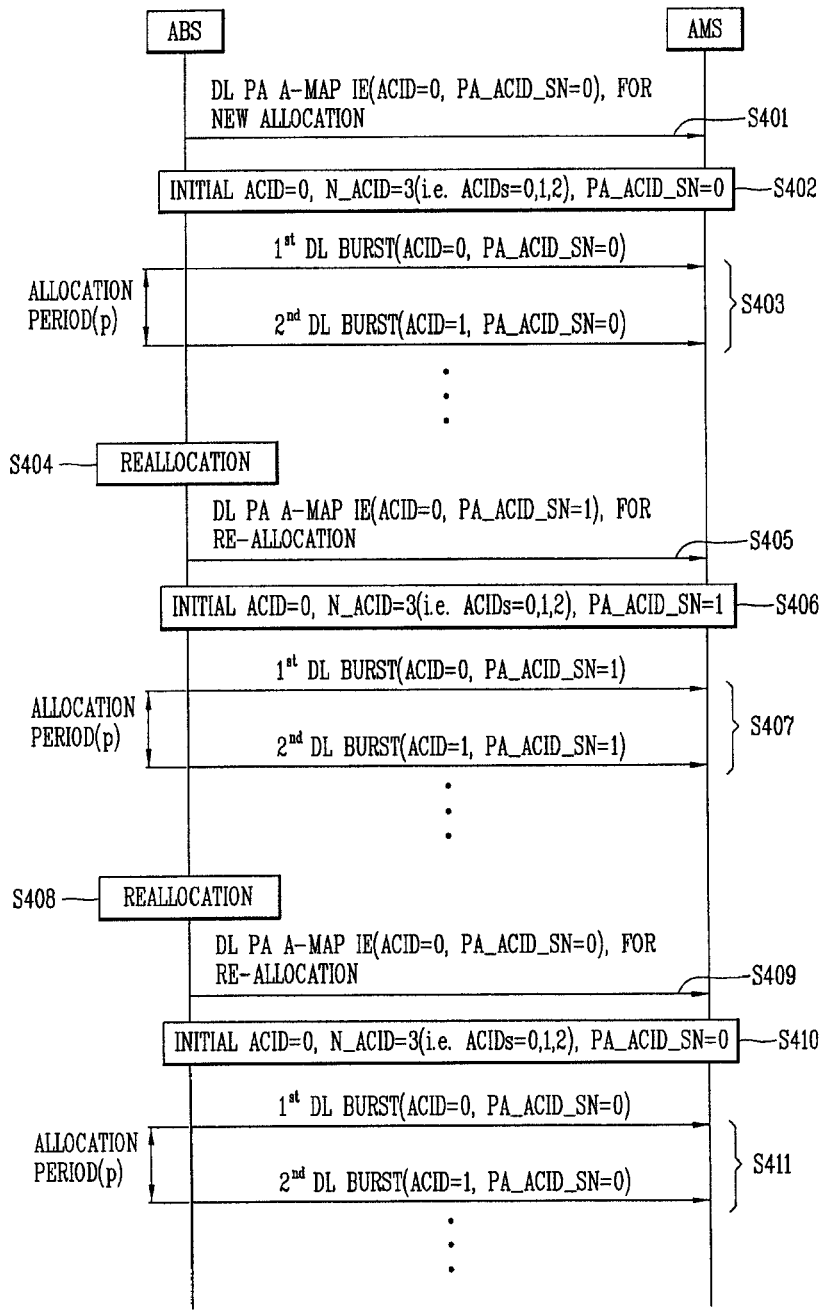
FIG. 4 is a flowchart showing a method for allocating ACID using PA_ACID_SN included in DL PA A-MAP IE, upon persistent resource reallocation in accordance with a second exemplary embodiment.

FIG. 4 is a flowchart showing a method for allocating ACID using PA_ACID_SN included in DL PA A-MAP IE, upon persistent resource reallocation in accordance with a second exemplary embodiment.

First, the base station may send DL PA A-MAP IE (hereinafter, referred to as 'DL PA A-MAP') including persistent resource allocation information to the terminal in order to allocate a new persistent resource.

The DL PA A-MAP may include ACID field indicating HARQ channel identifier for a persistent resource. The ACID field may include information related to an initial ACID value for a persistent resource allocation, and information related to the number of ACIDs (N_ACID) available for the persistent resource allocation. FIG. 4 shows that the initial ACID value is set to '0' and N_ACID is determined as 3 (S402).

Also, the map message, namely, DL PA A-MAP may further include ACID sequence number field (PA_ACID_SN).

The ACID sequent number field (PA_ACID_SN) indicates a sequence number of ACID allocated to each burst during persistent allocation.

The PA_ACID_SN may be set to '0' upon a new persistent resource allocation and increase by '1' every time reallocation is generated in the persistent allocation. Also, the PA_ACID_SN may be represented with 1 or two bits. When the PA_ACID_SN has 1-bit size, it is toggled every time of reallocation.

FIG. 4 shows that the PA_ACID_SN has 1-bit size and the DL PA A-MAP is sent for new persistent resource allocation at Step S401. Hence, the PA_ACID_SN is set to '0' (S402).

The base station then allocates ACIDs to DL bursts at every persistent allocation period in the ACID cycling manner, namely, by circularly using ACIDs, based upon the initial ACID value and the number of ACID. Here, the sequence number (PA_ACID_SN) of ACID allocated to each DL burst is all the same as '0' (S403).

During the persistent allocation between the base station and the terminal, for applying a link adaptation (MCS level change) or removing a resource hole, namely, when any change occurs in the previously allocated persistent resource information, the base station may perform reallocation for the currently allocated persistent resource (S404).

Here, the persistent resource information may indicate MCS level of a persistent resource, location and size of the persistent resource. The reallocation for the persistent resource is used for establishing a link adaptation (MCS change) or avoiding a resource hole.

The terminal and the base station may recognize whether a persistent resource allocation by the DL PA A-MAP is a new allocation or a reallocation of the existing persistent resource, based upon existence of non-existence of a persistent allocation in the corresponding subframe.

As shown in FIG. 4, upon sending the DL PA A-MAP to the terminal for real-location, the PA_ACID_SN included in the DL PA A-MAP is toggled to be set to '1.' Therefore, the sequence numbers of ACIDs allocated to the respective DL bursts after reallocation are all set to '1' (S405~S407).

During persistent allocation by the reallocation, if reallocation is performed due to the change of the persistent resource information (S408), the base station sends the DL PA A-MAP having the PA_ACID_SN set to '0' to the terminal. Here, the initial ACID value is '0' and the number of ACIDs is 3 in the ACID field, which are the same values as those in the ACID field in the initial persistent allocation. After reallocation, the sequence numbers of ACIDs allocated to the respective DL bursts are all '0' (S409~S411).

Uplink (UL)

Figure 5:
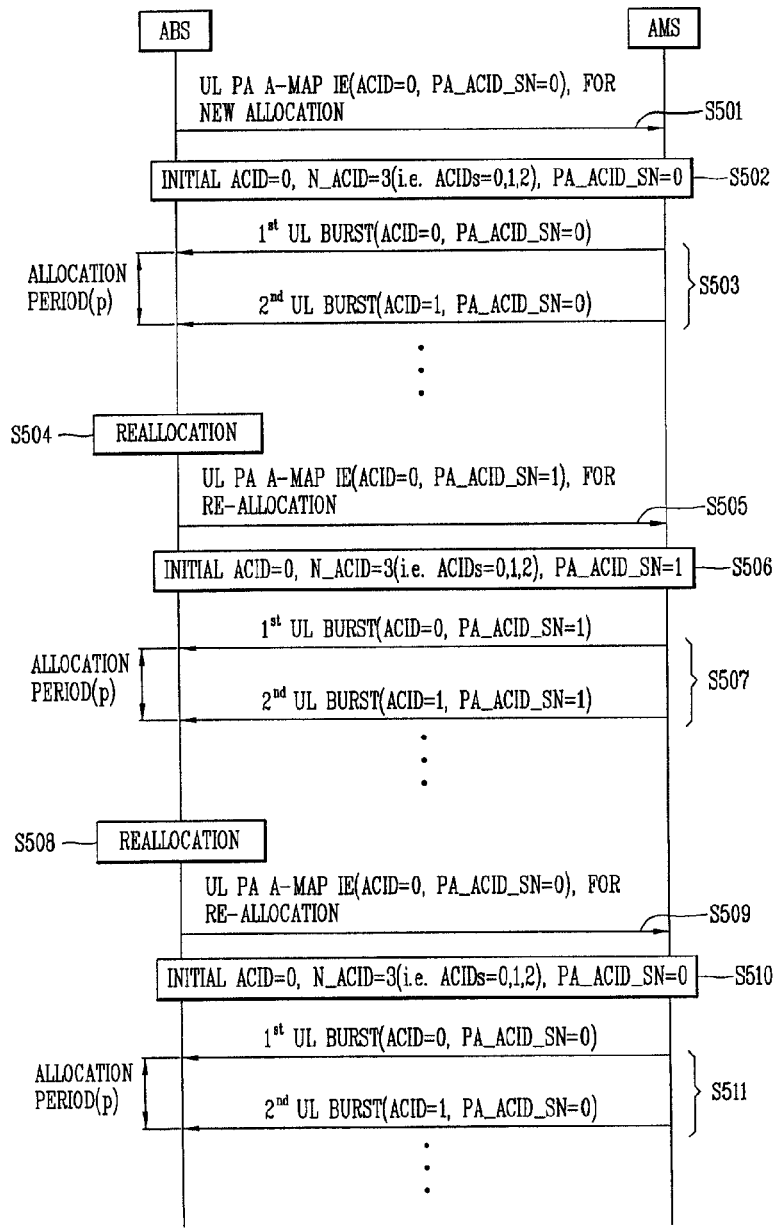
FIG. 5 is a flowchart showing a method for allocating ACID using PA_ACID_SN included in UL PA A-MAP IE, upon persistent resource reallocation in accordance with a second exemplary embodiment.

FIG. 5 is a flowchart showing a method for allocating ACID using PA_ACID_SN included in UL PA A-MAP IE, upon persistent resource reallocation in accordance with a second exemplary embodiment.

The base station may send UL PA A-MAP IE (hereinafter, referred to as 'UL PA A-MAP') including persistent resource allocation information, in order to allocate a new persistent resource to the terminal (S501).

The UL PA A-MAP may include ACID field indicating HARQ channel identifier for the persistent resource. The ACID field may include information related to an initial ACID value for a persistent resource allocation, and information related to the number of ACIDs (N_ACID) available for the persistent resource allocation. FIG. 5 shows that the initial ACID value is '0' and the number of ACIDs is 3 (S502).

Also, the map message, namely, UL PA A-MAP may further include ACID sequence number field (PA_ACID_SN).

The ACID sequent number field (PA_ACID_SN) indicates a sequence number of ACID allocated to each burst during persistent allocation.

The PA_ACID_SN may be set to '0' upon allocation of a new persistent resource and increase by '1' every time reallocation is generated in the persistent allocation. Also, the PA_ACID_SN may be represented with 1 or two bits. When the PA_ACID_SN has 1-bit size, it is toggled every time of reallocation.

FIG. 5 shows that the PA_ACID_SN has 1-bit size and the UL PA A-MAP is sent for new persistent resource allocation at Step S401. Hence, the PA_ACID_SN is set to '0' (S502).

The terminal then allocates ACIDs to UL bursts at every persistent allocation period in the ACID cycling manner, namely, by circularly using ACIDs, based upon the initial ACID value and the number of ACID. Here, the sequence numbers (PA_ACID_SN) of ACIDs allocated to the respective UL bursts are all the same as '0' (S503).

During the persistent allocation between the base station and the terminal, for applying a link adaptation (Modulation and Coding Scheme (MCS) level change) or removing a resource hole, namely, when any change occurs in the previously allocated persistent resource information, the base station may perform reallocation for the currently allocated persistent resource (S504).

Here, the persistent resource information indicates a MCS level of the persistent resource, location and size of the persistent resource. The reallocation of the persistent resource may be used for establishing a link adaptation (MCS change) or avoiding a resource hole.

Also, the terminal and the base station may recognize whether a persistent resource allocation by the UL PA A-MAP is a new allocation or a reallocation of the existing persistent resource, based upon existence or non-existence of a persistent allocation in the corresponding subframe.

As shown in FIG. 5, upon sending the UL PA A-MAP to the terminal for reallocation, the PA_ACID_SN included in the UL PA A-MAP is toggled to be set to '1.' Therefore, the sequence numbers of ACIDs allocated to the respective UL bursts after reallocation are all set to '1' (S505~S507).

During persistent allocation by the reallocation, if reallocation is re-performed due to the change of the persistent resource information (S508), the base station sends the UL PA A-MAP having the PA_ACID_SN set to '0' to the terminal. Here, the initial ACID value is '0' and the number of ACIDs is 3 in the ACID field, which are the same values as those in the ACID field in the initial persistent allocation. After reallocation, the sequence numbers of ACIDs allocated to the respective UL bursts are all equally '0' (S509~S511).

Table 4 shows an example of DL/UL Persistent Allocation A-MAP IE including PA ACID SN (size=2 bits).

TABLE 4

| Syntax | Size(bit) | Description/Notes |
| --- | --- | --- |
| DL/UL Persistent Allocation A-MAP_IE( ) { | | |
| A-MAP IE Type | 4 | DL/UL Persistent Allocation A-MAP IE |
| ... | | |
| ACID | 4 | Initial ACID value |
| PA_ACID_SN | 2 | Sequence number of persistent allocation HARQ Channel ID indicates the sequence number of ACID<br>0b00: 0<br>0b01: 1<br>0b10: 2<br>0b11: 3<br>Method for deciding PA_ACID_SN in base station PA_ACID_SN is set to 0 in new allocation, increases by 1 every time of reallocation, and decided as a value divided by the total number.<br>In re-allocation, PA_ACID_SN = (PA_ACID_SN+1) / (the number of PA_ACID_SN).<br>... |

Table 5 shows an example of DL/UL Persistent Allocation A-MAP IE for decision of PA ACID SN (size=1 bit).

TABLE 5

| Syntax | Size(bit) | Description/Notes |
| --- | --- | --- |
| DL/UL Persistent Allocation A-MAP_IE( ) { | | |
| A-MAP IE Type | 4 | DL/UL Persistent Allocation A-MAP IE |
| ... | | |
| ACID | 4 | Initial ACID value |
| PA_ACID_SN | 1 | Sequence number of persistent allocation HARQ Channel ID indicates the sequence number of ACID.<br>0b0: 0<br>0b1: 1<br>Method for deciding PA_ACID_SN in base station<br>In New allocation, PA_ACID_SN is set to 0, and toggled every time of reallocation.<br>... |

Figure 6:
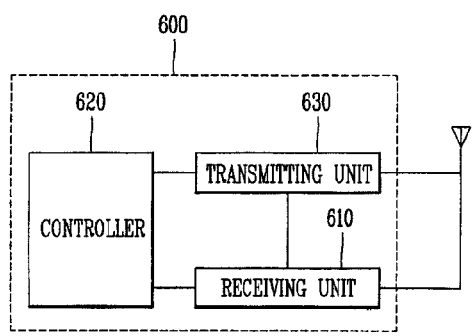
FIG. 6 is an internal block diagram of a terminal in accordance with an exemplary embodiment.

FIG. 6 is an internal block diagram of a terminal in accordance with an exemplary embodiment.

As shown in FIG. 6, a terminal 600 may include a receiving unit 610, a controller 620 and a transmitting unit 630.

The receiving unit 610 may receive a map message including ACID field, which indicates HARQ channel identification information, in a certain subframe from a base station. Here, the map message may be DL/UL PA A-MAP.

The ACID field may include at least one of information related to an initial ACID value and information related to the number of ACIDs, and be set to the same value as the ACID field in a persistent resource allocation prior to reception of the map message.

The controller 620 may check whether or not there is a previously allocated persistent resource in the certain subframe, in which the map message has been received. According to the check result, if the previously allocated persistent resource is present in the certain subframe, the controller 620 may detect an ACID value allocated to the data burst in the persistent resource allocation prior to reception of the map message upon reception of the map message.

Afterwards, the controller 620 may control the detected ACID value to be allocated as ACID value for a first data burst after the map message.

After allocating the ACID value to the first data burst, the controller 620 may also control ACID values to be circularly allocated to data bursts succeeding the first data burst, based upon the ACID field included in the map message.

The transmitting unit 630 may transmit or retransmit to the base station the ACID-allocated DL/UL bursts, which are sent to a persistent resource allocation area indicated by the map message sent by the base station.

The foregoing embodiments and advantages are merely exemplary and are not to be construed as limiting the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for allocating a hybrid automatic repeat request channel identifier (ACID) in a persistent resource allocation, the method comprising:
    setting an ACID field in a map message, wherein the ACID field has a same ACID value as ACID value used in a previous persistent allocation if a change occurs in information related to a persistent resource previously allocated to a terminal; and
    sending, to the terminal, the map message in a subframe, wherein the subframe is equal to a subframe allocated by the previous persistent allocation,
    wherein the ACID value of the ACID field in the map message is used for a first data burst transmitted via the resource indicated by the map message.

2. The method of claim 1, further comprising circularly allocating ACIDs to data bursts succeeding the first data burst using the ACID field of the map message after allocating the ACID value to the first data burst after the transmission of the map message.

3. The method of claim 1, wherein the ACID field of the map message further comprises the number of ACIDs available for the persistent resource allocation.

4. The method of claim 3, wherein the number of ACIDs is decided the same as the number of ACIDs of the persistent resource previously allocated to the terminal prior to the change occurred.

5. The method of claim 3, wherein the number of ACIDs is decided according to [Equation 1]:

$$N\_ACID=Floor\{PA\_Max\_ReTx\_Delay/(Allocation\ Period*Frame\_length)\}+1, \text{ and} \qquad [\text{Equation 1}]$$

wherein N-ACID indicates the number of ACIDs,
Floor{ } indicates a floor function, and
PA_Max_ReTx_Delay indicates a maximum retransmission delay time.

6. The method of claim 1, wherein the persistent resource information is at least one of a modulation and coding scheme level, location and size of the persistent resource allocated to the terminal.

7. A method for allocating a hybrid automatic repeat request channel identifier (ACID) in a persistent resource allocation, the method comprising:
receiving a map message including an ACID field in a specific subframe from a base station, the ACID field including an ACID value to be newly allocated;
checking whether or not a previously allocated persistent resource is present in the specific subframe, in which the map message is received; and
allocating the ACID value of the ACID field in the map message as an ACID value for a first data burst transmitted via resource indicated by the map message, when the previously allocated persistent resource is present in the specific subframe.

8. The method of claim 7, further comprising after allocating the ACID value to the first data burst, circularly allocating ACID values to data bursts succeeding the first data burst using the ACID field included in the map message.

9. The method of claim 7, wherein the ACID field comprises at least one of information representing an initial ACID value and information representing the number of ACIDs.

10. The method of claim 9, wherein the initial ACID value is decided the same as the initial ACID value in the persistent resource allocation prior to the reception of the map message.

11. The method of claim 9, wherein the number of ACIDs is decided the same as the number of ACIDs in the persistent resource allocation prior to the reception of the map message.

12. The method of claim 9, wherein the number of ACIDs is decided according to [Equation]:

$$N\_ACID=Floor\{PA\_Max\_ReTx\_Delay/(Allocation\ Period*Frame\_length)\}+1, \text{ and} \qquad [\text{Equation 1}]$$

wherein N-ACID indicates the number of ACIDs,
Floor{ } indicates a floor function, and
PA_Max_ReTx_Delay indicates a maximum retransmission delay time.

13. A terminal for allocating a hybrid automatic repeat request channel identifier (ACID) in a persistent resource allocation comprising:
a receiving unit configured to receive a map message in a specific subframe from a base station, the map message including an ACID field including an ACID value to be newly allocated; and
a controller configured to check whether or not a previously allocated persistent resource is present in the specific subframe, in which the map message is received, to allocate the ACID value of the ACID field in the map message as an ACID value for a first data burst transmitted via resource indicated by the map message, when the previously allocated persistent resource is present in the specific subframe.

14. The terminal of claim 13, wherein the controller is configured to circularly allocate ACID values to data bursts succeeding the first data burst using the ACID field included in the map message after allocating the ACID value to the first data burst.

15. The terminal of claim 13, wherein the ACID field comprises at least one of information representing an initial ACID value and information representing the number of ACIDs, and is decided the same as the ACID field used in the persistent resource allocation prior to the reception of the map message.

* * * * *